W. J. WAINWRIGHT & H. R. SMITH.
MACHINE FOR MANUFACTURING SPIRALLY REINFORCED PILE SHELLS.
APPLICATION FILED NOV. 4, 1913.
1,155,389.
Patented Oct. 5, 1915.
5 SHEETS—SHEET 1.
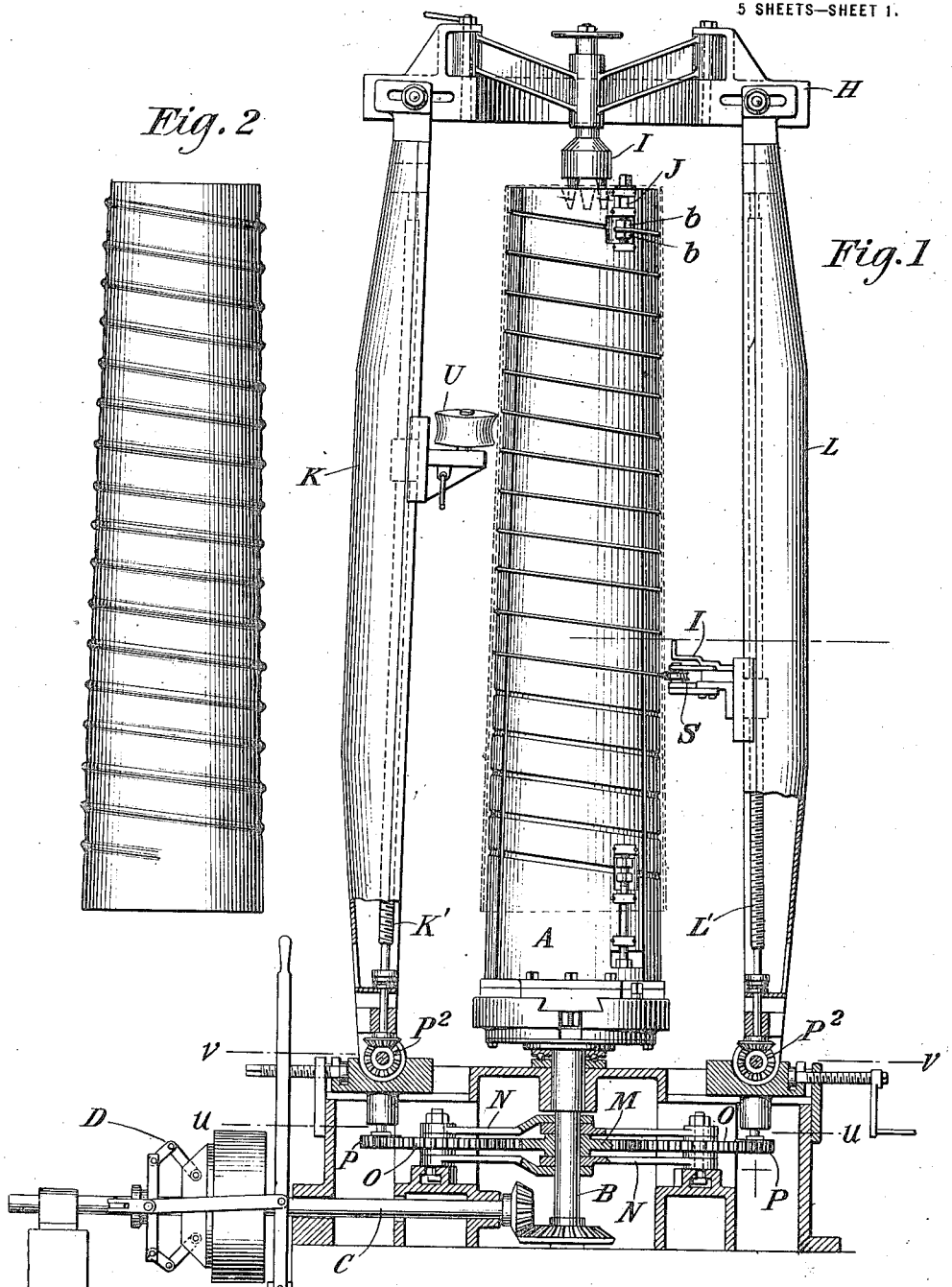
H. R. Smith and
William J. Wainwright, Inventors

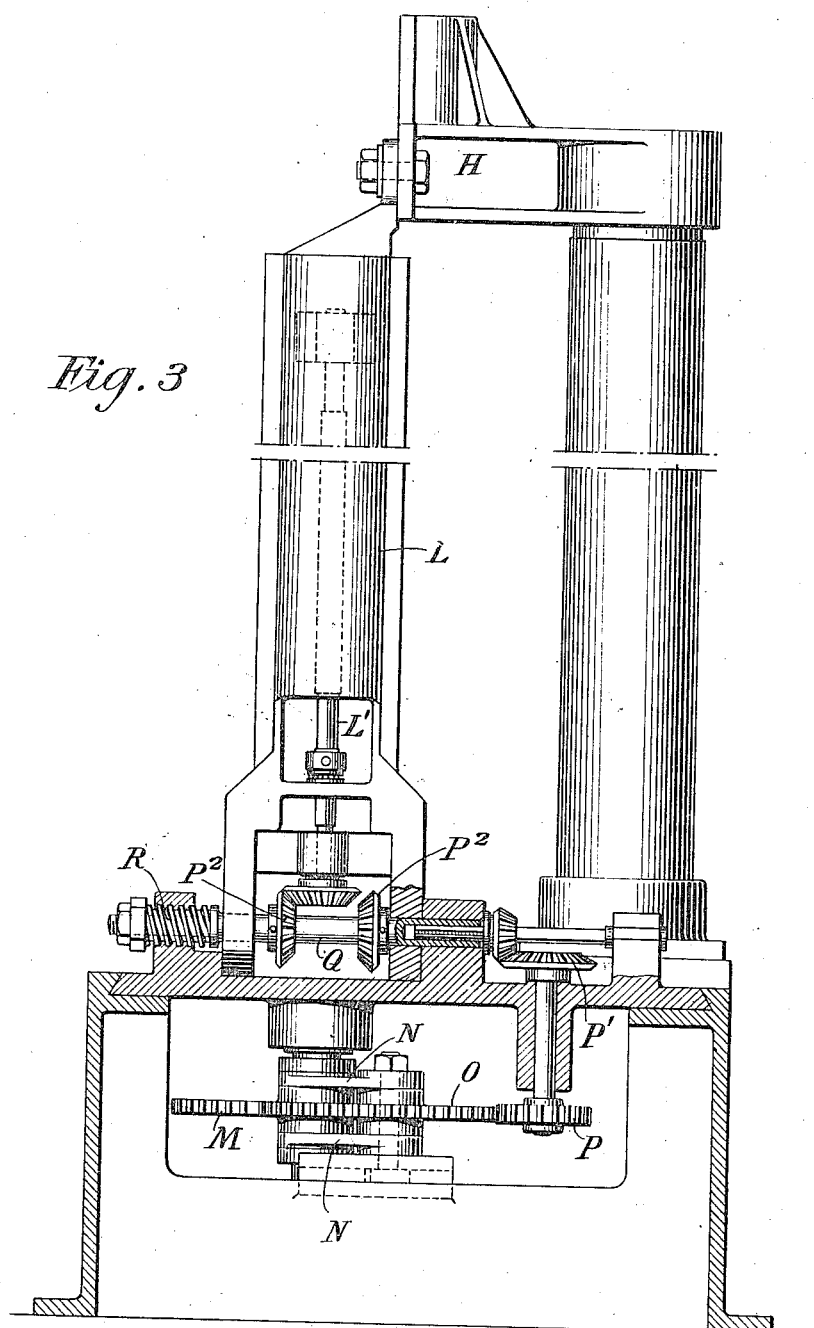

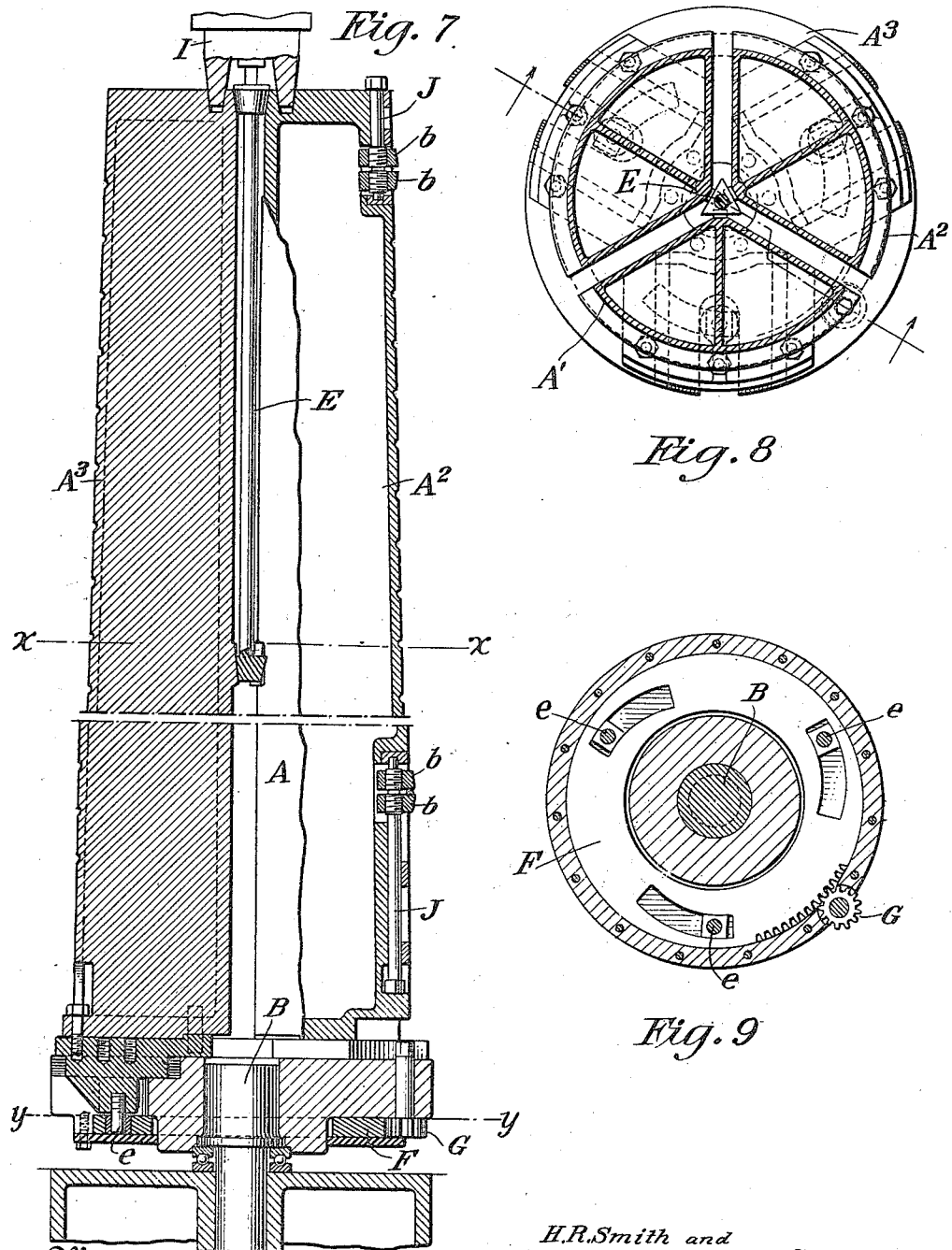

W. J. WAINWRIGHT & H. R. SMITH.
MACHINE FOR MANUFACTURING SPIRALLY REINFORCED PILE SHELLS.
APPLICATION FILED NOV. 4, 1913.
1,155,389.
Patented Oct. 5, 1915.
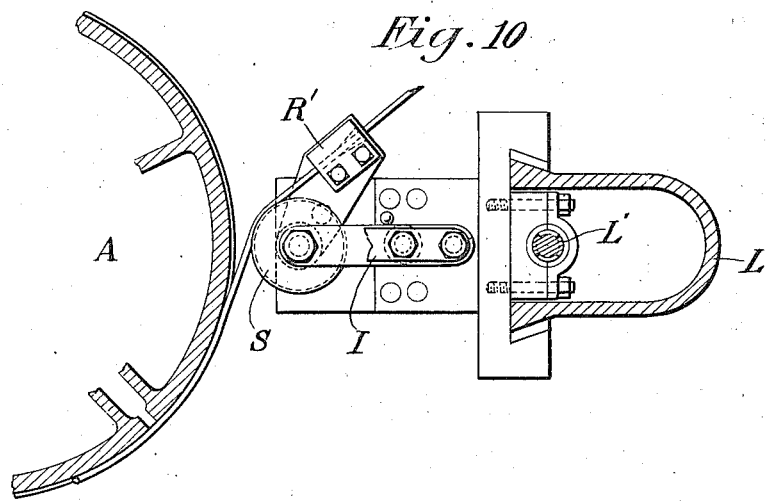
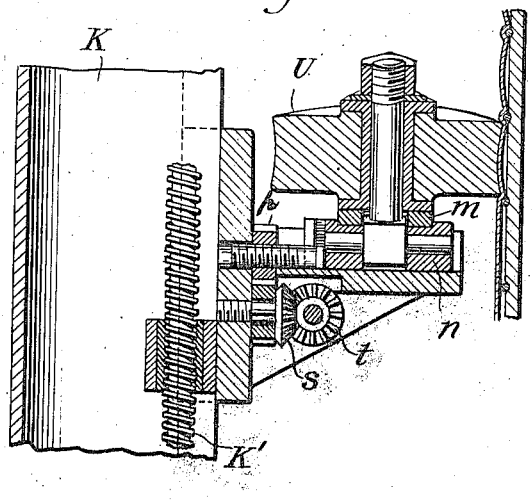
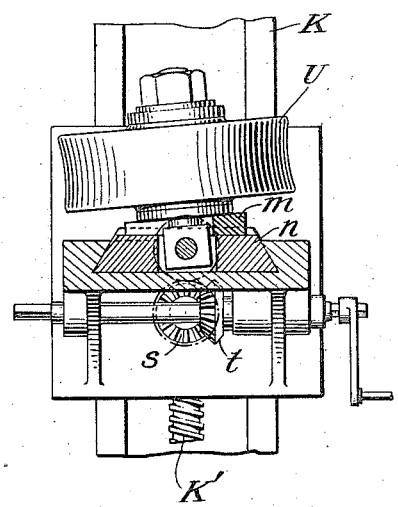

UNITED STATES PATENT OFFICE.

WILLIAM J. WAINWRIGHT, OF BRAINERD, ILLINOIS, AND HERMAN RAYMOND SMITH, OF NEW YORK, N. Y., ASSIGNORS TO RAYMOND CONCRETE PILE COMPANY, OF NEW YORK, N. Y., A CORPORATION OF NEW JERSEY.

MACHINE FOR MANUFACTURING SPIRALLY-REINFORCED PILE-SHELLS.

1,155,389. Specification of Letters Patent. Patented Oct. 5, 1915.

Application filed November 4, 1913. Serial No. 799,091.

*To all whom it may concern:*

Be it known that we, WILLIAM J. WAINWRIGHT and HERMAN R. SMITH, citizens of the United States, residing at Brainerd, county of Cook, and State of Illinois, and New York, county and State of New York, respectively, have invented certain new and useful Improvements in Machines for Manufacturing Spirally-Reinforced Pile-Shells, of which the following is a full, clear, and exact description.

In the manufacture of piles of concrete it is customary to form a thin shell of metal of the shape and size of the pile, to drive the same by means of a core, to withdraw the core after the pile has been driven and to fill the shell with concrete. As the shell serves merely as a receptacle for the soft concrete and in time is destroyed by the action of air and water, it becomes desirable to make it as strong as possible by the use of the least quantity of material, and for this purpose it has been proposed to make the shell of thin sheet metal reinforced by wire wound spirally and contained in a groove of corresponding form in the material of the shell. The invention subject of this application for Letters Patent is a machine for applying to or incorporating with the shell such wires.

There are numerous features of improvement embodied in the machine the main feature of which is the use of two devices movable longitudinally with respect to a mandrel over which the shell may be forced and one of which winds a wire spirally around the mandrel and the other forces the interior of the shell around the wire.

The other features of invention are in details of construction which may be best described and understood by reference to the accompanying drawings.

Figure 4:
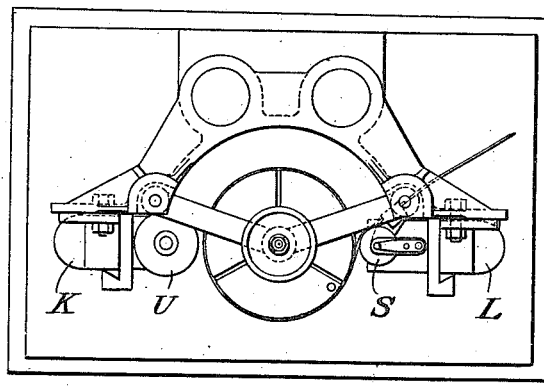
Figure 5:
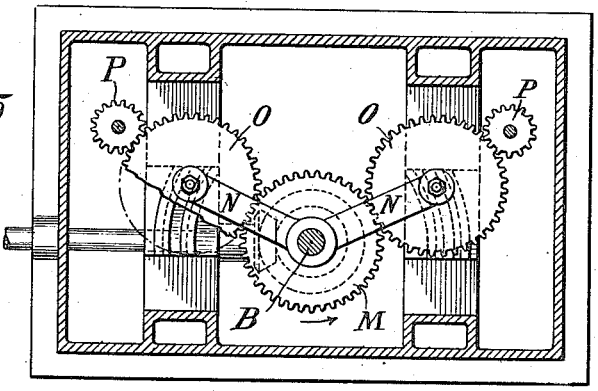
Figure 6:
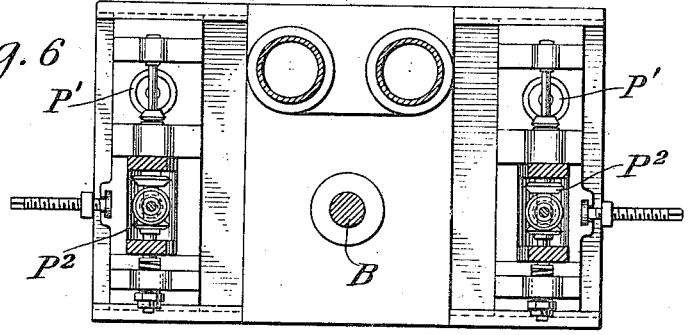

Figure 1 is a view partly in elevation and partly in section of the complete machine. Fig. 2 is an elevation of the reinforced portion of the shell. Fig. 3 is a side view in elevation and part section of the machine. Fig. 4 is a top plan view of the same. Fig. 5 is a sectional view on line *u—u* of Fig. 1 Fig. 6 is a similar sectional view on line *v—v* of Fig. 1. Fig. 7 is a vertical sectional view of the mandrel. Fig. 8 is a section of the same on line *x—x* of Fig. 7. Fig. 9 is a section on the line *y—y* of the same figure. Fig. 10 is an enlarged detail of the wire winding mechanism. Fig. 11 is a vertical section, and 12 a sectional elevation of the means for compressing the material of the shell around the wire.

Similar letters of reference in the several figures indicate corresponding parts of the device.

The apparatus comprises a collapsible mandrel or core for carrying the shell which part is indicated by the letter A. This element rests upon an anti-friction bearing upon a suitable base and is provided with a shaft B by means of which it is rotated by a continuously driven power shaft C adapted to be thrown into and out of gear by a clutch D. The construction of the mandrel will be understood by reference to Figs. 7, 8 and 9 in which it is shown as composed of three parts $A'$, $A^2$, $A^3$, which in operation are forced outwardly by a rod E with beveled ends which is screwed or otherwise forced down over inclined surfaces when the shell is in place. To adapt the mandrel to shells of varying size the lower ends of the segments are provided with dowel pins $e$ which enter eccentric slots in a base plate F turned by a gear and pinion G that may be conveniently operated by a handle or a wrench.

The upper ends of the segments $A'$, $A^2$ and $A^3$ are suitably secured to a head H in any convenient manner, as by pins in a block I that is capable of being raised and lowered by a screw or otherwise, and the mandrel is provided with clamps for the wire at its opposite ends each comprising two blocks $b$, $b$, on spindles J mounted in recesses in the mandrel and provided with right and left hand threads so that when the spindles are turned, as by a wrench, the blocks $b$, $b$, are brought together to bind or clamp the end of a wire.

On either side of the mandrel and having a pivotal connection with the base is a suitable support K or L having, in the main, the form of a half tube. Through these supports extend two threaded rods $K'$ and $L'$ which are adapted to be rotated in either direction by the main power shaft substantially in the manner shown in Figs. 1, 5 and 6. That is to say, on the main spindle B is a gear wheel M and arms N turning about said shaft and carrying gear wheels O meshing with pinions P. The pinions P are on short spindles mounted in the base and carry beveled gears P' that mesh with bevel gears P² on a horizontal shaft having a feathered connection with spindles Q movable longitudinally by means of screw threaded sleeves R so as to bring either of two bevel gears on the shafts Q into mesh with bevel gears on the ends of screw rods K', L' or to release the rods from engagement with the gearing. The special purpose of this arrangement is to permit the supports K and L to be moved with reference to the mandrel to which they must always bear a fixed relation when in operation. It will be seen that the upper ends of the supports K and L are attached to the head H by bolts working in slots and that the supports for said devices are movable to and from the axes of the core or mandrel.

On one of the screw rods, as L', is the wire winding device and on the other K' is the device for forcing the shell around the wires. The former is a grooved wheel S secured by a toggle I to a carriage having a threaded connection with the rod L', by means of which toggle it may be withdrawn from proximity to the mandrel, and a wire guide R' also mounted on the carriage.

The grooving attachment U is mounted in a bushing is pivoted to its carriage, and by means of a wedge $m$ between the bushing and the carriage it may be set at varying angles. It is adjusted to and from the mandrel by being mounted on the sliding block $n$ which is moved in guide-ways by a threaded spindle operated by a pinion $p$ in gear with a pinion having a bevel wheel $s$ which is turned by a bevel wheel $t$, the shaft of which is adapted to receive a handle.

The grooving device is a wheel with sunken periphery of a width slightly less than the distance between wires and the method or effect of its operation is clearly illustrated in Fig. 11.

The operation of the machine will be readily understood from the above description to be as follows: The grooving attachment having been withdrawn from the mandrel the end of a wire is inserted in the upper clamp $b$ and the machine started in operation with the winding attachment in proximity to the mandrel. The gearing and pitch of the screw on the rods K' and L' are so arranged that for one revolution of the mandrel the carriage of the winding device or that for the grooving device travels vertically about three inches and a groove of this pitch is cut in the mandrel so that by the operation of the device the wire is wound therein. When the winding carriage has covered the mandrel the wire is secured by the lower clamp $b$ and cut off, and the winding device withdrawn from the mandrel. A sheet-metal shell is then forced down over the wire-wound mandrel, the grooving attachment brought into operation therewith and the machine again started. The wheel U by this operation is forced into the shell of metal and carries the same around the wire, grooving the shell as shown in Fig. 2, and as the grooving device descends the winding device ascends, so that when the operation is completed, the machine is in condition for the application of another wire. The grooving device is always at its lowest point at the time when the winding device is at its starting point and conversely.

In the practical operation of the device numerous details are employed and various operations performed which have not been fully described herein. For example, it is desirable, if not necessary, to make suitable provision for removing the arms which support the upper end of the mandrel in order to put on and remove therefrom the shell and any suitable devices may be employed for this purpose. Again, when the shell is forced down over the wire around the mandrel the wire is not sufficiently tight against the shell. Moreover, by the operation of the grooving attachment the diameter of the shell is slightly increased, but as it is necessary that the wire should be in firm contact with the shell, in practice it is necessary to screw the shell, after the grooving operation, down over the wire, and this may be done by means of a roped sling or any other devices suitable for the purpose.

After the operation is complete, the mandrel is collapsed in the usual manner and the shell with the wire incorporated therewith is removed. During the operation, it will be understood, that the supports K and L must be exactly parallel with the mandrel and not only the particular means shown and described but any other suitable for the purpose may be employed for effecting such parallelism.

Having now described the invention in the best manner known to us in which it may be practised, we claim:

1. In a machine of the kind described, the combination with a mandrel of a device for winding a wire spirally thereon and a device for grooving a superposed shell of metal over the wire to form a reinforced shell.

2. In a machine of the kind described, the combination with a revolving mandrel, of means for winding the wire spirally thereon, and means for grooving a superposed shell of metal over the wire to form a reinforced shell.

3. In a machine of the kind described, the combination with a mandrel and means for revolving the same, of supports parallel with the surface of the mandrel, a device for winding a wire spirally around the mandrel mounted on one of the supports, and a grooving attachment for forcing a superposed metal shell around the wire mounted on the other support, and means for causing the wire winding and grooving attachments to move longitudinally with respect to the mandrel.

4. In a machine of the kind described, the combination with a mandrel and means for revolving the same, of supports parallel with the surface of the mandrel, a device for winding a wire spirally around the mandrel, a threaded rod in one support carrying the winding device, a grooving attachment for forcing the superposed sheet metal shell around the wire, a threaded rod in the other support carrying the said attachment and means for imparting rotation to the threaded rods.

5. In a machine of the kind described, the combination with a revoluble mandrel, of a wire winding device movable longitudinally with respect thereto, whereby a wire may be wound spirally about said mandrel, and a grooving wheel movable longitudinally with respect to the mandrel, whereby a superposed metal shell may be forced around the wire and a reinforced shell produced.

6. In a machine of the kind described, the combination with a mandrel and means for rotating the same, of supports, one for a wire winding and the other for a grooving attachment both of which are capable of longitudinal movement with respect to said mandrel, and means for adjusting the said supports to parallelism with the surface of the mandrel.

7. In a machine of the kind described, the combination with a mandrel and means for rotating the same, of supports, a wire winding device mounted on one and a grooving device on the other, both of said devices being capable of longitudinal movement with respect to the mandrel, and means for for moving said devices toward and from the mandrel for the purpose set forth.

8. The combination with a collapsible mandrel for concrete pile shells, of supports parallel to the surface thereof, a wire winding device mounted on one support, a grooving device mounted on the other, and means for moving both devices longitudinally with respect to the said mandrel.

9. The combination with a mandrel containing a spiral groove, of means for winding a wire in said groove and means for forcing the metal of a superposed shell around the exposed portion of the wire as set forth.

10. The combination with a revoluble mandrel, supports parallel with the surface thereof and provided with revoluble threaded rods therein, of a wire winding device mounted on a carriage movable longitudinally with respect to the mandrel by engaging with the screw rods in one support, and a grooving attachment for forcing a superposed sheet of metal around the wire mounted in a carriage movable longitudinally with respect to the mandrel by engagement with the screw rods in the other support.

11. The combination with a mandrel, of means for arranging a wire spirally thereon, and means for forcing the metal of a superposed shell toward said mandrel and upon the said wire.

In testimony whereof we affix our signatures in the presence of two subscribing witnesses.

WILLIAM J. WAINWRIGHT.
HERMAN RAYMOND SMITH.

Witnesses:
WM. BOHLEBER,
DRURY W. COOPER.